United States Patent [19]
Peppers et al.

[11] Patent Number: 5,086,490
[45] Date of Patent: Feb. 4, 1992

[54] OPTICAL PATTERN EXTRACTING APPARATUS

[75] Inventors: Norman A. Peppers, Belmont; Gregory K. Myers, San Francisco; James R. Young, Palo Alto, all of Calif.; Kazuo Katsuki, Tokyo, Japan

[73] Assignee: Nippon Sheet Glass Co., Ltd., Osaka, Japan

[21] Appl. No.: 474,585

[22] Filed: Feb. 7, 1990

[51] Int. Cl.$^5$ .............................................. G06K 9/00
[52] U.S. Cl. .................................. 382/65; 250/327.2; 364/736
[58] Field of Search ...................... 382/31, 32, 68, 12, 382/13, 65; 250/560, 327.2; 358/213.18; 364/736

[56] References Cited

U.S. PATENT DOCUMENTS

| | | | |
|---|---|---|---|
| 3,694,806 | 9/1972 | Freedman | 382/65 |
| 4,442,550 | 4/1984 | Killat | 382/65 |
| 4,603,253 | 7/1986 | Nakagawa | 250/327.2 |

Primary Examiner—David K. Moore
Assistant Examiner—Tan Dinh
Attorney, Agent, or Firm—Woodcock Washburn Kurtz Mackiewicz & Norris

[57] ABSTRACT

An optical pattern extracting apparatus has sets of strip-like photodetection elements oriented in horizontal, vertical and diagonal directions for decomposing a displayed character to be recognized, the photodetection elements are distributed in a large number of parallel microimage channels generated through an optical image multiplication system and the photodetection elements cover a display area of the character without their photodetection areas overlapping each other.

32 Claims, 20 Drawing Sheets

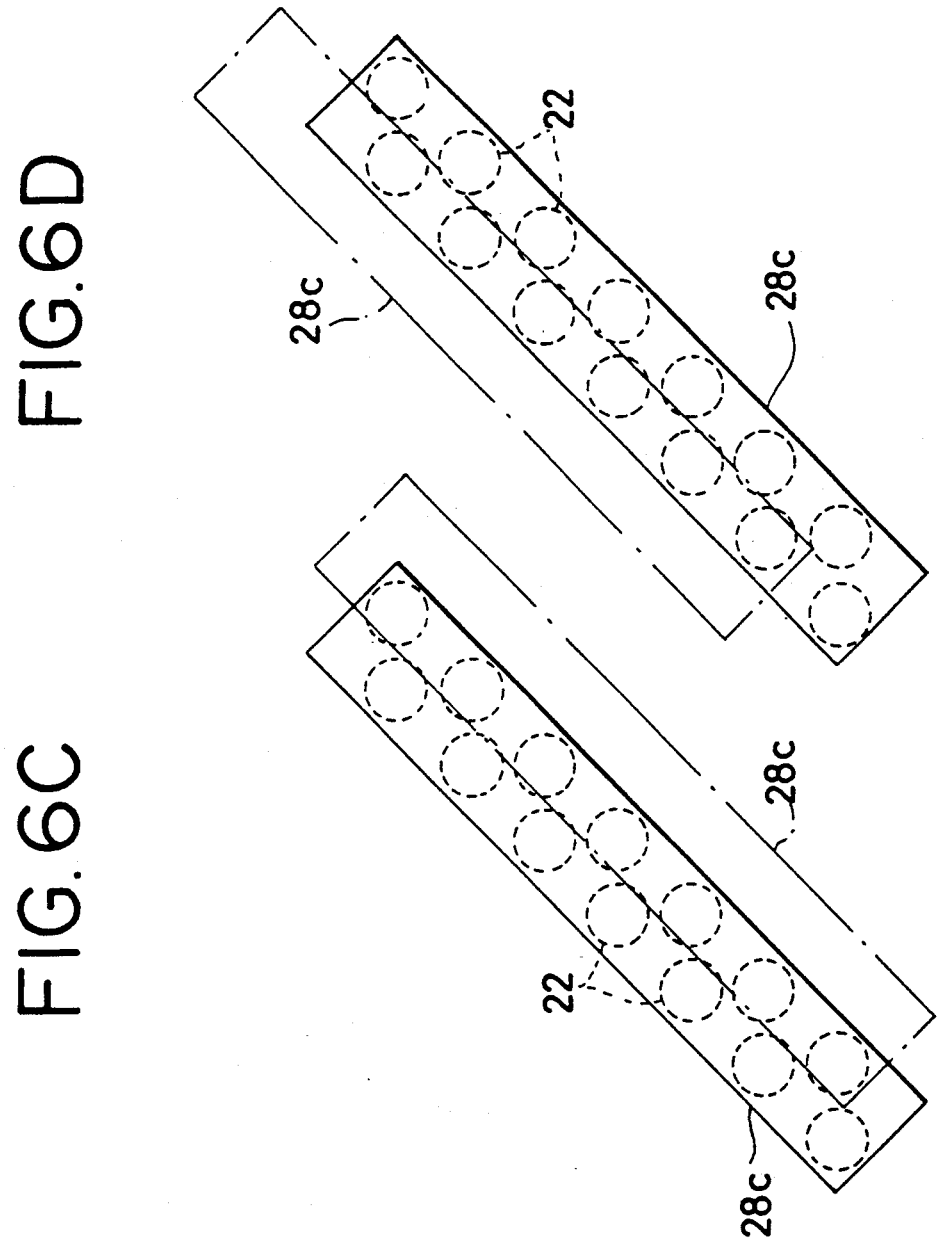

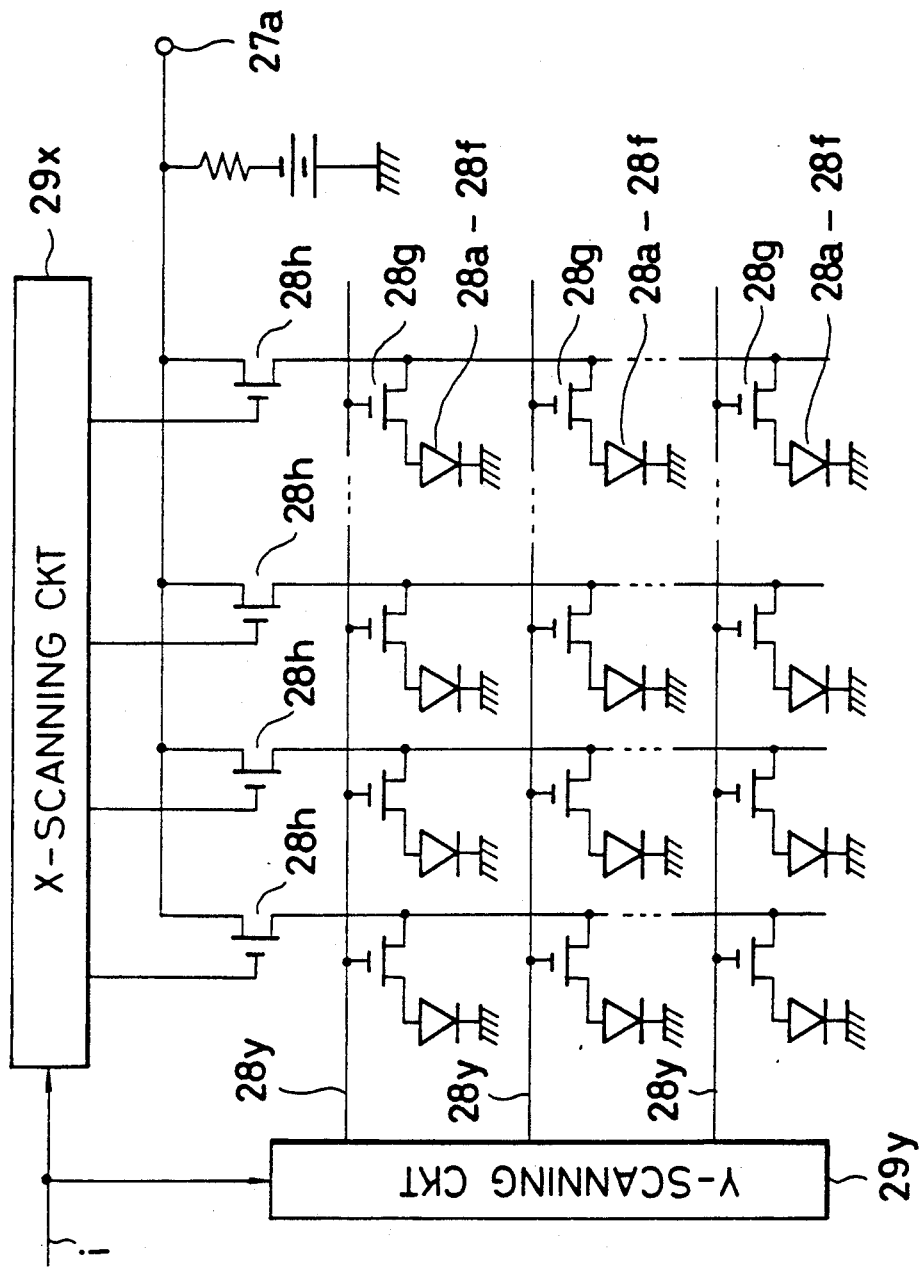

FIG. 11

|  |  |  |  |
|---|---|---|---|
| S1 | S2 | S3 | S4 |
| S5 | S6 | S7 | S8 |
| S9 | S10 | S11 | S12 |
| S13 | S14 | S15 | S16 |

| H1 0 | H2 0 | H3 20 | H4 0 |
|---|---|---|---|
| H5 17 | H6 18 | H7 23 | H8 0 |
| H9 0 | H10 22 | H11 28 | H12 16 |
| H13 0 | H14 16 | H15 0 | H16 0 |

FIG.12B

| V1 0 | V2 0 | V3 0 | V4 10 |
|---|---|---|---|
| V5 20 | V6 25 | V7 28 | V8 31 |
| V9 0 | V10 19 | V11 20 | V12 14 |
| V13 0 | V14 0 | V15 6 | V16 7 |

FIG.12C

| P1 0 | P2 0 | P3 0 | P4 0 |
|---|---|---|---|
| P5 0 | P6 0 | P7 22 | P8 0 |
| P9 0 | P10 29 | P11 0 | P12 0 |
| P13 9 | P14 0 | P15 0 | P16 0 |

FIG.12D

| N1 0 | N2 0 | N3 20 | N4 0 |
|---|---|---|---|
| N5 0 | N6 28 | N7 16 | N8 0 |
| N9 0 | N10 0 | N11 21 | N12 0 |
| N13 0 | N14 0 | N15 0 | N16 18 |

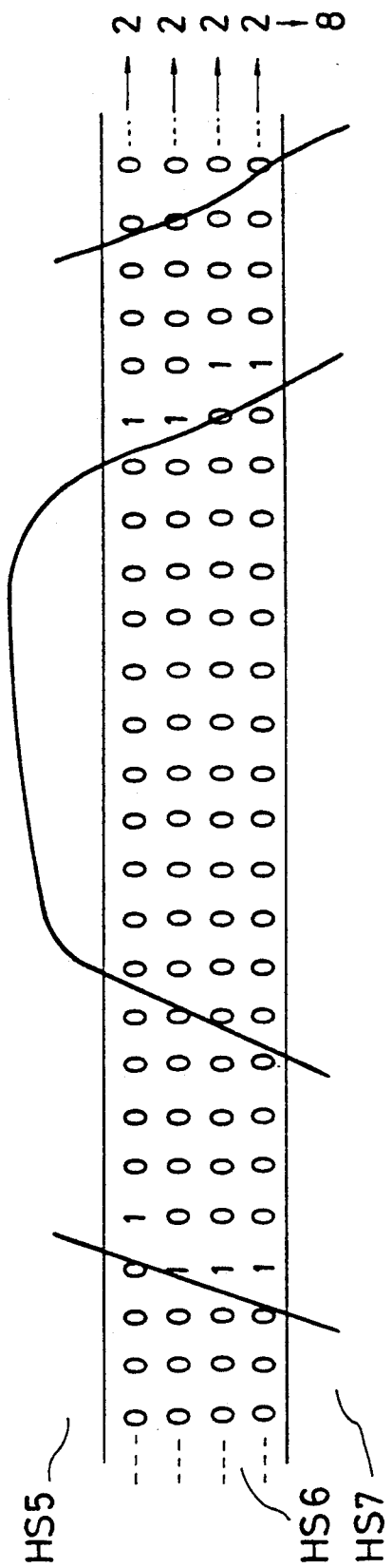

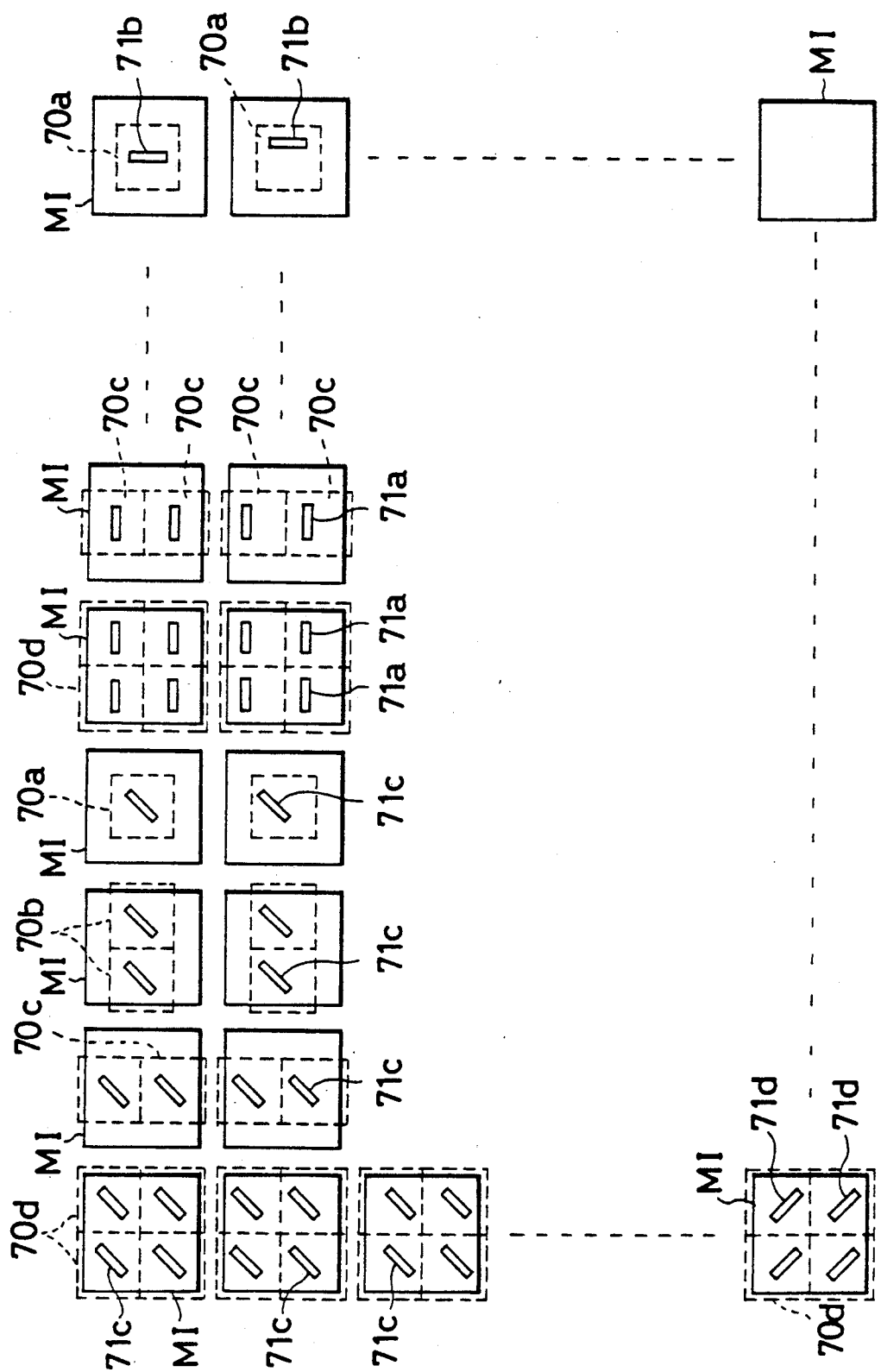

OPTICAL PATTERN EXTRACTING APPARATUS

BACKGROUND OF THE INVENTION

1. Field of the Invention

The present invention relates to an optical pattern extracting apparatus and, more particularly, to an optical pattern extracting apparatus suitably applied to an OCR (Optical Character Reader) for recognizing handwritten kanji or Chinese characters.

2. Description of the Related Art

In an apparatus (OCR) for reading handwritten characters, various types of pattern recognition techniques have been utilized. No remarkable technique having a low error rate has been established in a kanji OCR.

U.S. Pat. No. 3,252,140 to Lemay discloses a technique wherein a large number of reference feature masks having elemental features constituting character patterns are prepared, a character image to be recognized is caused to overlap feature masks to optically detect a degree of correlation, and each character is specified on the basis of correlation information.

The prepared reference feature masks are produced to display character images of correct styles at proper positions and have appropriate thicknesses. When positions, sizes and thicknesses of, e.g., handwritten characters are changed, and styles are deformed, the degree of matching between the character images and the feature mask is lowered to increase an error rate in character identification.

In order to recognize complex characters such as kanji characters, a very large number of feature masks must be prepared, and collation between the characters and the feature masks is time-consuming.

U.S. Pat. No. 4,573,198 to Anderson discloses a technique wherein a character image is optically Fourier-transformed and is collated with reference feature patterns in a frequency region. A processing system independent of positional variations in character images requires a coherent light source since this processing system is a Fourier transformation optical system, thus resulting in a bulky apparatus.

SUMMARY OF THE INVENTION

It is, therefore, a principal object of the present invention to provide an extracting system capable of accurately identifying complex character and graphic patterns (e.g., handwritten kanji characters) subjected to deformation.

It is another object of the present invention to provide a spatial elemental feature extracting means independent of image positions and deformations.

It is still another object of the present invention to provide a versatile elemental feature extracting means capable of being applied to characters having any shapes without depending on individual character patterns.

It is still another object of the present invention to allow pattern recognition within a very short period of time by performing parallel processing of a large number of elemental feature extracting means.

It is still another object of the present invention to provide an elemental feature extracting means capable of easily improving precision (resolution) without geometric limitations and of being manufactured easily.

The optical pattern extracting apparatus according to the present invention comprises display means consisting of arrays of radiant pixels for forming a radiant image of a pattern to be recognized in accordance with input image data, an image multiplication optical system for optically multiplying the radiant image displayed on the display means into a large number of parallel microimages, and a large number of strip-like photosensor means, located at focusing positions of the microimages, for decomposing the pattern to be recognized into constituent elements and detecting the constituent elements, wherein each of the strip-like photosensor means comprises groups of elements oriented in horizontal, vertical and diagonal directions, the elements comprise a large number of photodetection elements offset in the horizontal and vertical directions in units of pixels so as to cover the entire surface of the microimage, and the photodetection elements are distributed for the large number of microimages so as to prevent light-receiving areas of the photodetection elements from overlapping each other.

The photodetection element decomposes and extracts horizontal, vertical and diagonal stroke elements constituting the input image pattern. The layout of the photodetection elements needs not be specified for each of a large number of figures of pattern to be recognized. The resolution is constant for each of a large number of figures of pattern or largely deformed patterns such as handwritten characters, thus providing versatility. Feature data representing constituent elements of a pattern detected upon its decomposition is used for matching with reference data corresponding to a reference pattern.

BRIEF DESCRIPTION OF THE DRAWINGS

FIGS. 6A to 6D are views showing single sensor elements, respectively;

FIG. 9 is a view showing a read circuit of a photosensor array;

FIG. 11 is a view showing the segment layout in an image area for detecting a correlation value;

FIGS. 12A to 12D are views showing structures of correlation detection data;

FIG. 14 is an enlarged view showing one of the segments for detecting the crossing features; and FIGS. 15 and 16 are views showing modifications each having a photosensor array constituted by a light-shielding mask having a strip-like light-transmitting area and a direction photodetection element.

DETAILED DESCRIPTION OF THE PREFERRED EMBODIMENTS

Figure 1:
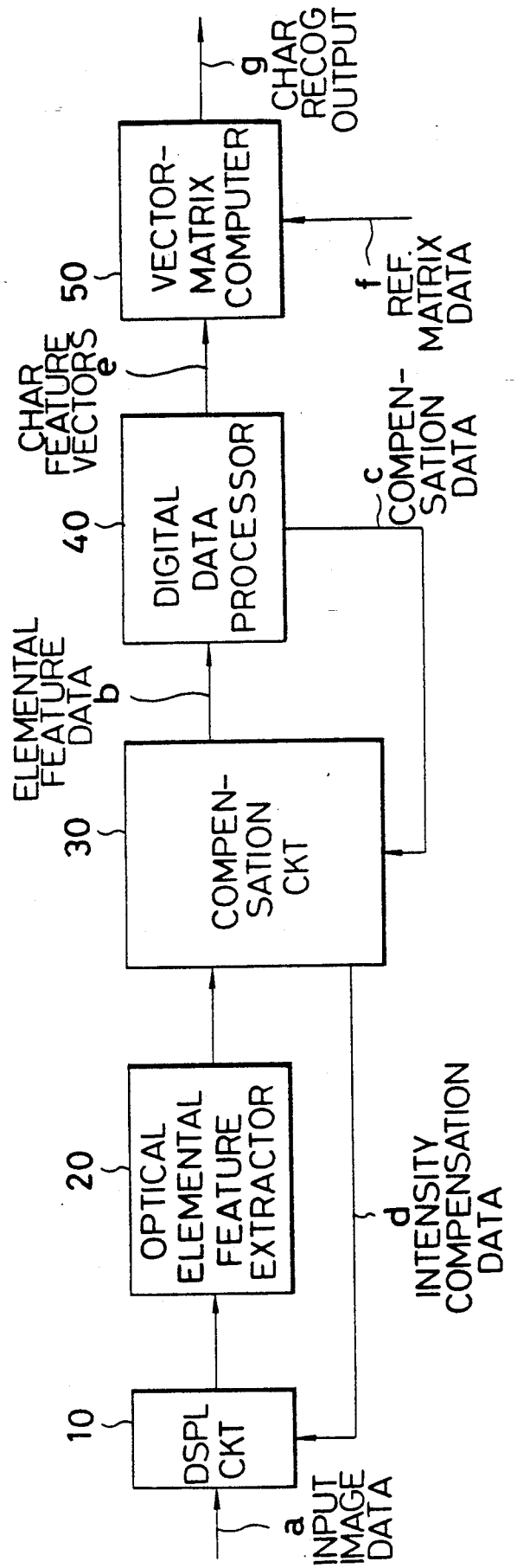
FIG. 1 is a block diagram showing an overall arrangement of a pattern recognition apparatus which employs the present invention.

FIG. 1 is a block diagram showing an overall arrangement of a pattern extracting apparatus. This extracting apparatus comprises a display circuit 10, an optical elemental feature extractor 20, a compensation circuit 30, a digital data processor 40 and a vector-matrix computer 50.

The optical elemental feature extractor 20 optically processes input image data a supplied in units of, e.g., characters through the display circuit 10, decomposes a two-dimensional image pattern into a large number of elements, and extracts 2676 elemental features. Extracted elemental feature information as 5-bit digital elemental feature data b is supplied to a digital data processor 40 through the compensation circuit 30 for compensating characteristics of the optical elements. The data processor 40 performs digital calculations such as additions, comparisons and counting of the elemental feature data b to generate a character feature vector e consisting of 108 components (5-bit each).

The digital data processor 40 generates characteristic compensation data c of an optical element on the basis of the elemental feature data output from the elemental feature extractor 20. The compensation circuit 30 receives the compensation data c and performs operations such as light-receiving sensitivity compensation so that a large number of light-receiving elements constituting the elemental feature extractor 10 have the same resolution. In addition, the compensation circuit 10 supplies intensity compensation data d to the display circuit 10 so that a large number of radiant elements have the same intensity.

The character feature vectors e are supplied from the data processor 40 to the vector-matrix computer 50. The vector-matrix computer 50 multiplies the input character feature vectors e (each having 108 components) with, e.g., 6125 reference matrix data f. This multiplication operation corresponds to matching between the character feature vector e and one of the 6125 reference vectors. The input vector is identified by a matrix element corresponding to the maximum product-sum value. Therfore, a character recognition output g representing an input image is obtained from the vector-matrix computer 50.

Although the vector-matrix computer 50 falls outside the scope of the present invention, it can be constituted by a pipelined digital vector computer or an optical vector processor. An example of the optical vector processor is disclosed in U.S. patent application Ser. No. 283,730 by the present inventors.

Figure 2:
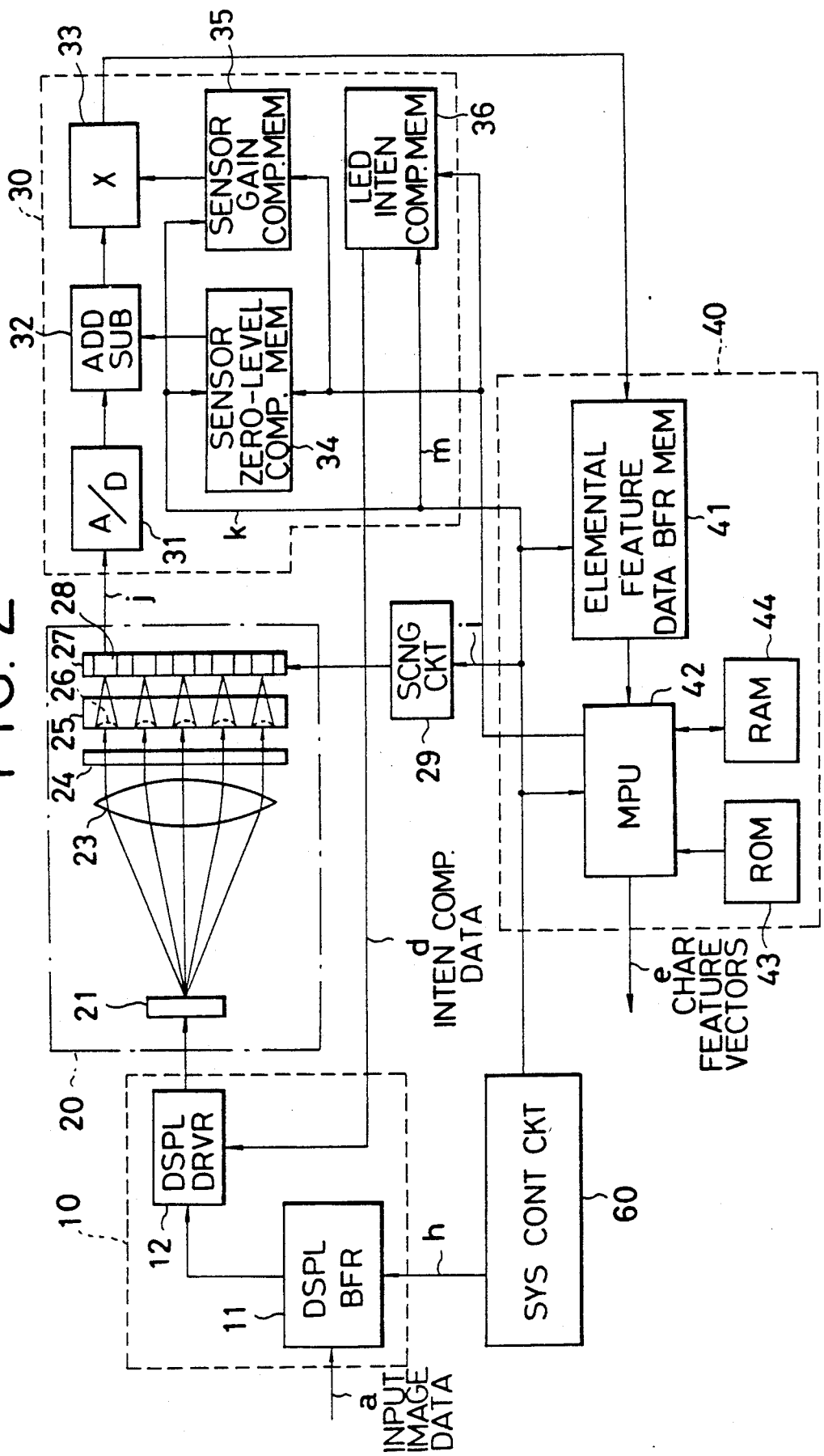
FIG. 2 is a block diagram showing a detail arrangement of each block in FIG. 1.

FIG. 2 is a detailed block diagram except for the vector-matrix computer 50 shown in FIG. 1. The display circuit 10 comprises a data display buffer 11 (32×32 bits) for storing one character of the input image data a and a display driver 12. Write and read addresses h of the display buffer 11 are supplied from a system control circuit 60. An output from the display buffer 11 is converted into a display signal by the display driver 12, and the display signal is supplied to a display 21 of the feature extractor 20. The intensity compensation data d supplied from the compensation circuit 30 is used to compensate the gain of the display signal so that the matrix-like radiant elements are operated at the same intensity.

Figure 3:
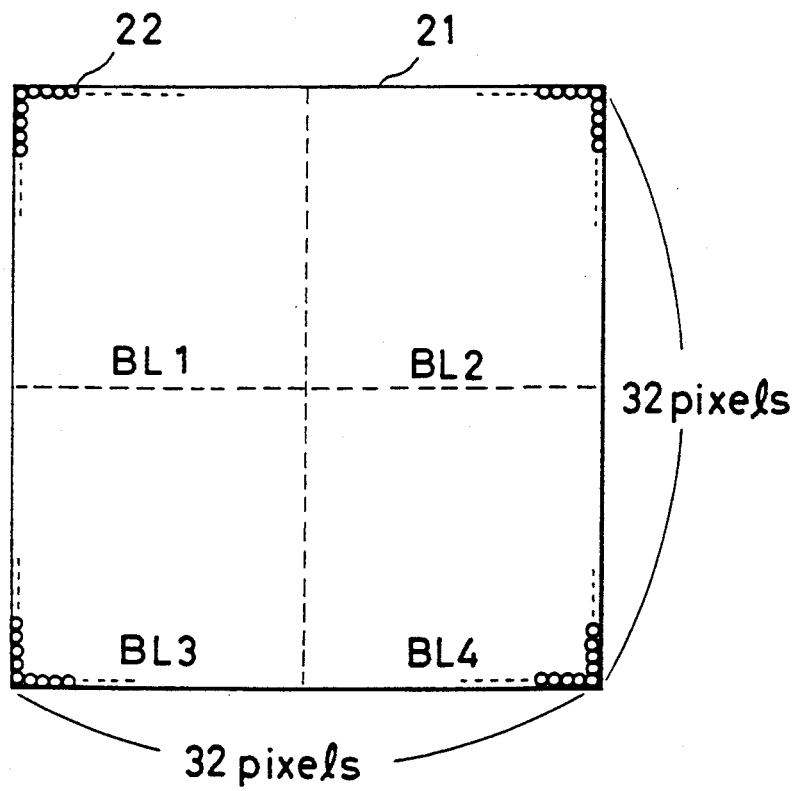
FIG. 3 is a plan view showing a pixel array of a display shown in FIG. 2.

As shown in FIG. 3, the display 21 comprises 32×32 radiant pixels 22. An input image is displayed by ON/OFF states of the pixels 22. Note that the input image data a is normalized beforehand so as to be displayed with an appropriate size at an appropriate position.

The pixels 22 are constituted by, e.g., an LED matrix array. The size of the display 21 is 11.4 mm square. Display control is performed by a dynamic turn-on scheme for sequentially scanning lines consisting of rows or columns. Alternatively, a static drive scheme for simultaneously turning on all the pixel LEDs may be employed. In order to scan the pixels, the pixels 22 are divided into four blocks BL1 to BL4 each consisting of 16×16 pixels, and the display driver 12 comprises a 4-block parallel drive circuit in favor of a display speed.

Figure 4:
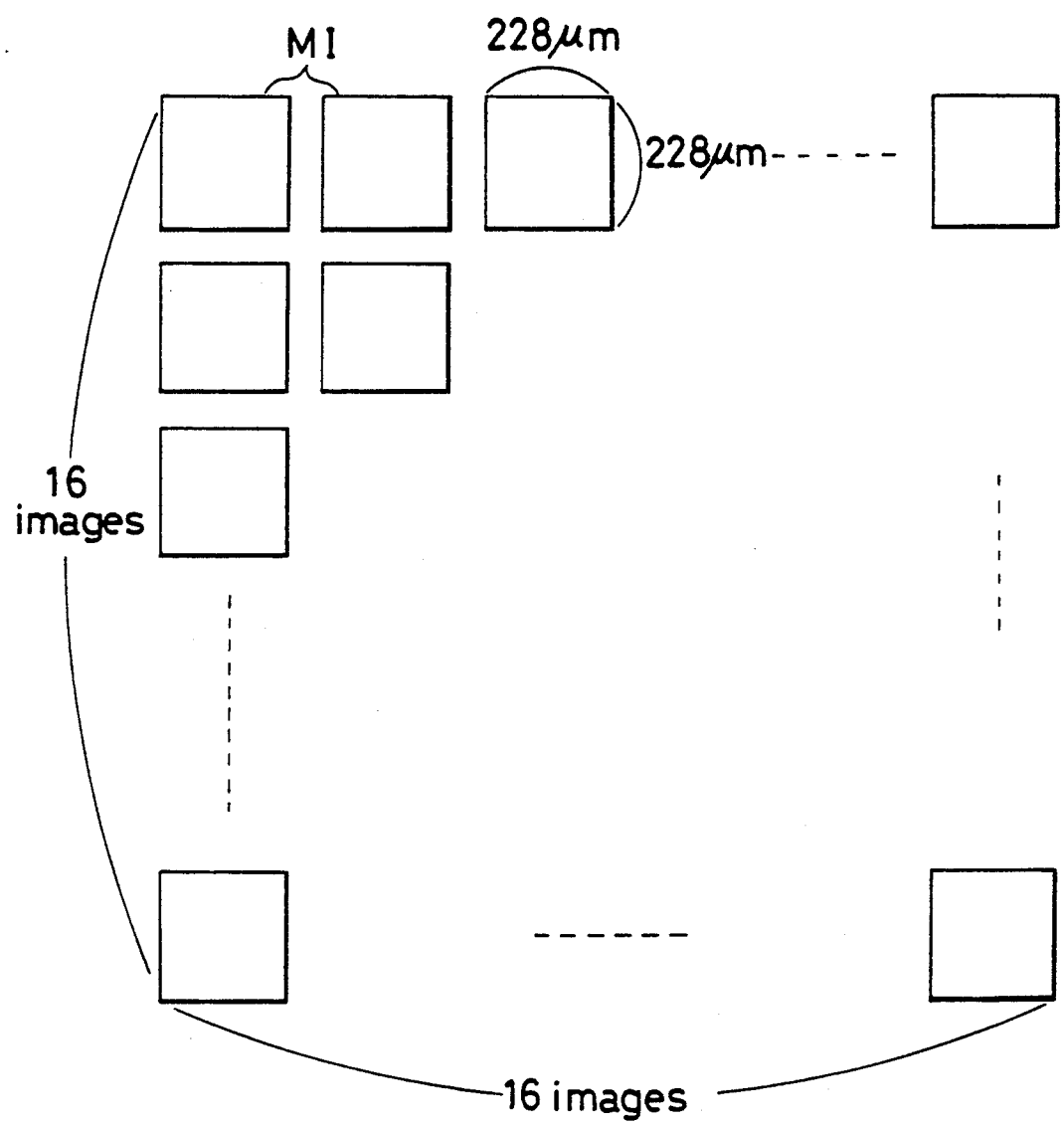
FIG. 4 is a view showing the layout of microimages formed by an image multiplication optical system shown in FIG. 2.

As shown in FIG. 2, a projection lens 23 (focal length: 35 mm) is arranged to oppose the front surface of the display 21. A lens array 25 is arranged on the exit surface side of the projection lens 23. The lens array 25 comprises, e.g., 256 focusing microlenses 26 constituting 16 rows and 16 columns. Each microlens 26 is made of, e.g., a gradient index lens (lens diameter: 230 $\mu$m; focal length: 1,000 $\mu$m). 256 multiplied microimages MI identical with the image displayed on the display 21 are formed on the focal plane of the lens array 25, as shown in FIG. 4. The size of each microimage MI is about 228 $\mu$m square, and one of the pixels corresponding to 32 (row)×32 (column) display image constituting one microimage has a size of 7.1 $\mu$m square.

An apodizing mask 24 for attenuating the transmitted beam on the optical axis and uniformly changing (increasing) the transmittance toward the periphery may be inserted between the projection lens 23 and the lens array 25, if needed. An image intensity distribution of axial symmetry on the focusing plane of the projection lens 23 is corrected by the mask 24.

A photosensor array 27 is arranged on the focal plane of the lens array 25, and the 256 microimages MI are formed on the surface of the photosensor array 27. The photosensor array 27 comprises a large number of strip-like (rectangular) sensor elements 28 for decompositing the microimage MI into horizontal, vertical and diagonal stroke elements and extracting them as elemental features. One sensor element 28 has a size of 14.2×71.0 $\mu$m which can contain, e.g., 2×10 pixels (each pixel has an area of 7.1 $\mu$m square) and detects positional matching of the stroke elements constituting the character image in accordance with a reception light amount.

The large number of sensor elements 28 are distributed in sensor blocks in a one-to-one correspondence with the 256 microimages so as not to optically overlap each other. The detailed structure of the photosensor array 25 will be described in detail later.

The photosensor array 27 has the same arrangement as, e.g., a MOS image sensor. An X-Y scanning circuit 29 consisting of MOS transistor switches read photoelectric conversion outputs of the respective sensor elements 28 in the form of a serial signal j. A read clock i and the like supplied to the scanning circuit 29 are supplied from the system control circuit 60. The serial signals j read from the photosensor array 27 are converted into about 5-bit digital data by an A/D converter 31 in the compensation circuit 30 in units of sensor outputs. The 5-bit digital data are supplied to an adder/subtracter 32. An output from the adder/subtracter 32 is supplied to a multiplier 33. The scanning circuit 29 may be arranged to read out signals from the photosensor array 27 to a plurality of parallel output channels. Each serial signal may be processed by the compensation circuit 30 having a plurality of channels.

The adder/subtracter 32 in the compensation circuit 30 compensates the sensor output levels and adds and subtracts the compensation values so that each sensor output level is set to be zero level in a non-signaling state. The multiplier 33 compensates the sensor output gains by multiplying them with correction coefficient values so that the output levels of the sensor elements 28 having different sensitivity levels are the same. Compensation data for the sensor zero level and the sensor gains are stored in a sensor zero-level compensation memory 34 and a sensor gain compensation memory 35, respectively, in a calculation mode to be described later. The system control circuit 60 supplies to the compensation memories 34 and 35 an address signal k synchronized with read scanning of the photosensor array 27. The compensation values corresponding to the respective sensor outputs are supplied to the adder/subtracter 32 and the multiplier 33.

The intensity compensation data d supplied to the display driver 12 is read out from the compensation memory 36. A read address m of the compensation memory 36 is supplied from the system control circuit 60 in synchronism with display scanning of the display 21.

The elemental feature data b compensated by the multiplier 33 is stored in the elemental feature data buffer memory 41 of the digital data processor 40. The buffer memory 41 consists of two memory areas corresponding to the two character input images sequentially supplied thereto. The two memory areas are alternately used such that while one memory area stores the elemental feature data, the elemental feature data set is read out from the other memory area and is subjected to data processing such as a correlation operation. The data processing is executed by a processor consisting of a microprocessing unit 42 (MPU), a program ROM 43 and a data RAM 44 in accordance with an algorithm (to be described later). The MPU 42 preferably has a processing speed of 15 MIPs or more.

The processing result is stored in a RAM 44, and is DMA-processed to be supplied to the vector-matrix computer 50 in FIG. 1 as the character feature vector e consisting of 108 components.

Figure 5A:
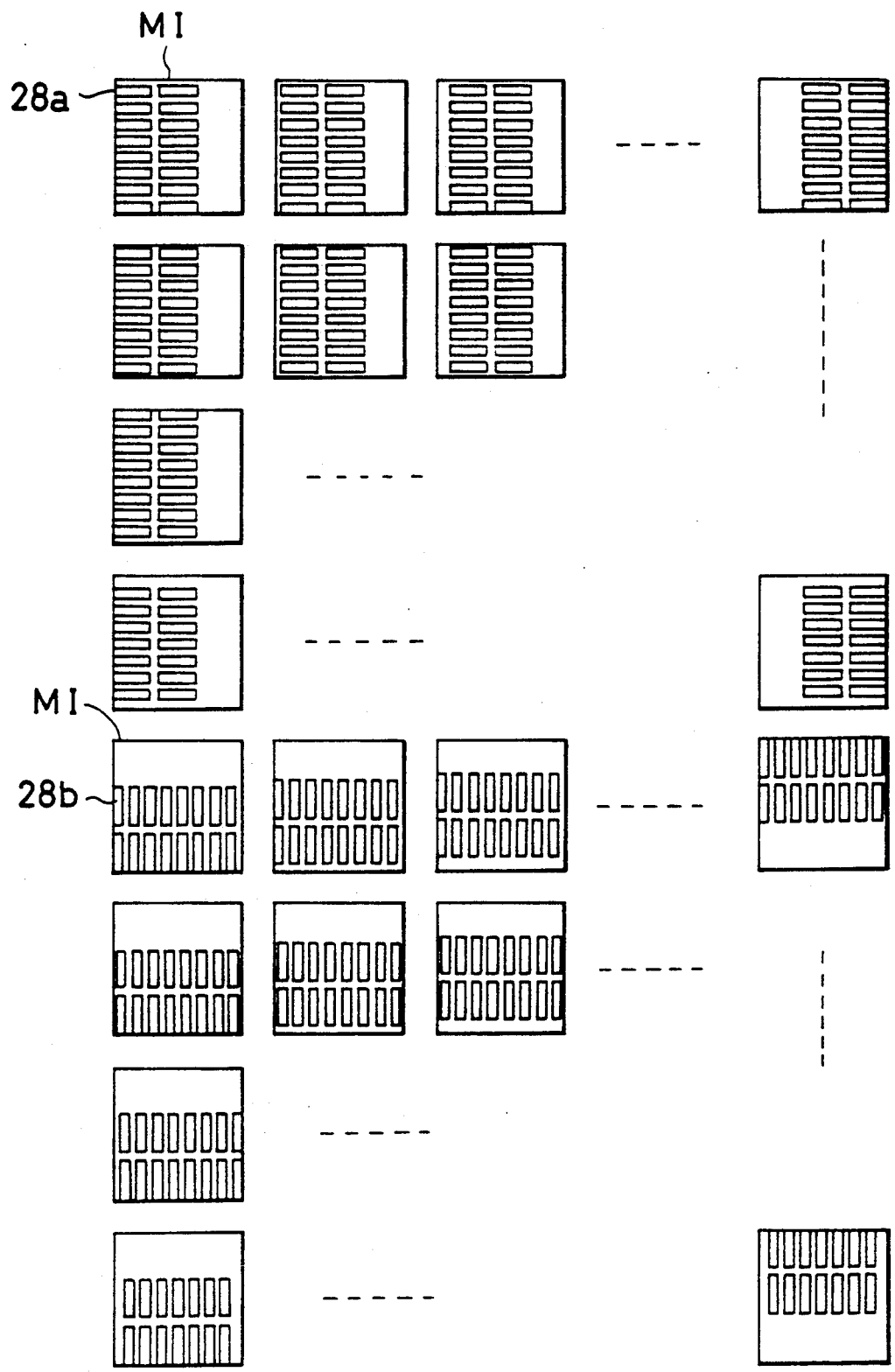
FIGS. 5A to 5C are views showing the layout of sensor elements in the photosensor array in FIG. 2.
Figure 5B:
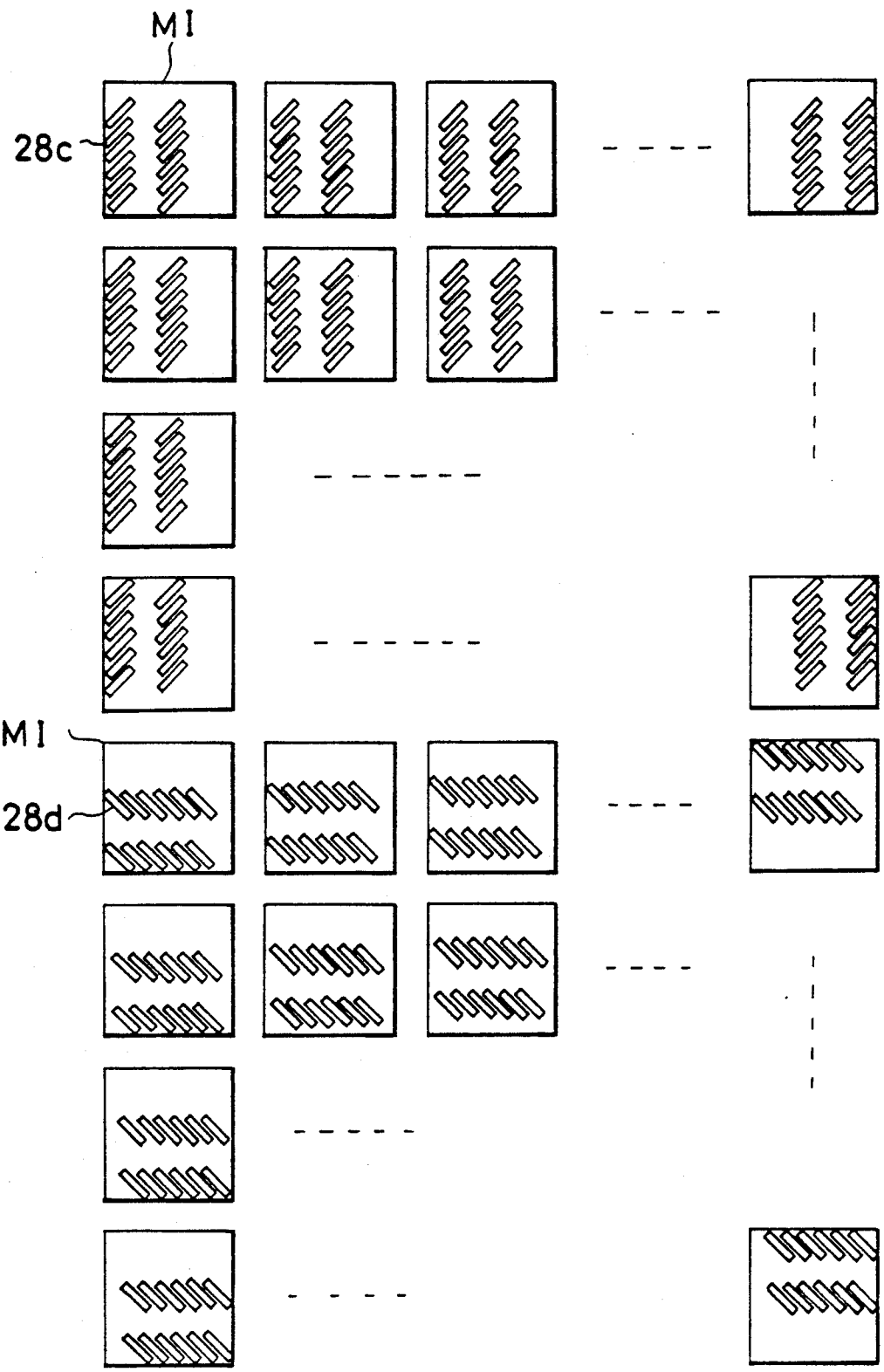
Figure 5C:
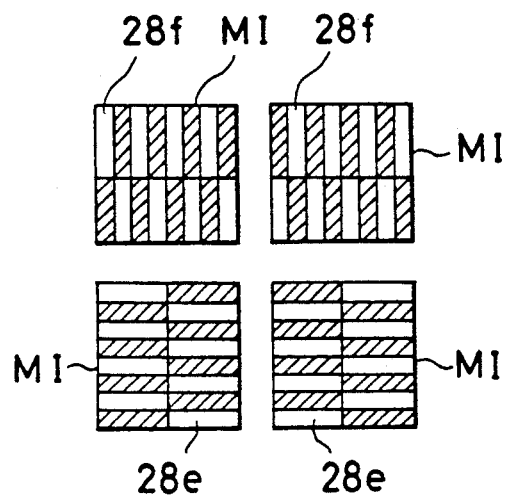

FIGS. 5A to 5C are plan views showing the main part of the photosensor array 27 and corresponds to some of 16×16 parallel microimages MI. The array 27 consists of sensor elements for extracting stroke elements of a character and sensor elements for extracting projection features. The sensor elements for extracting the stroke element include a horizontal (0°) sensor element 28a, a vertical (90°) sensor element 28b, as shown in FIG. 5A, and two diagonal (45° and 135°) sensor elements 28c and 28d, as shown in FIG. 5B. The sensor elements for extracting the projection features comprise horizontally and vertically split sensor elements 28e and 28f, as shown in FIG. 5C.

Figures 6A, 6B:
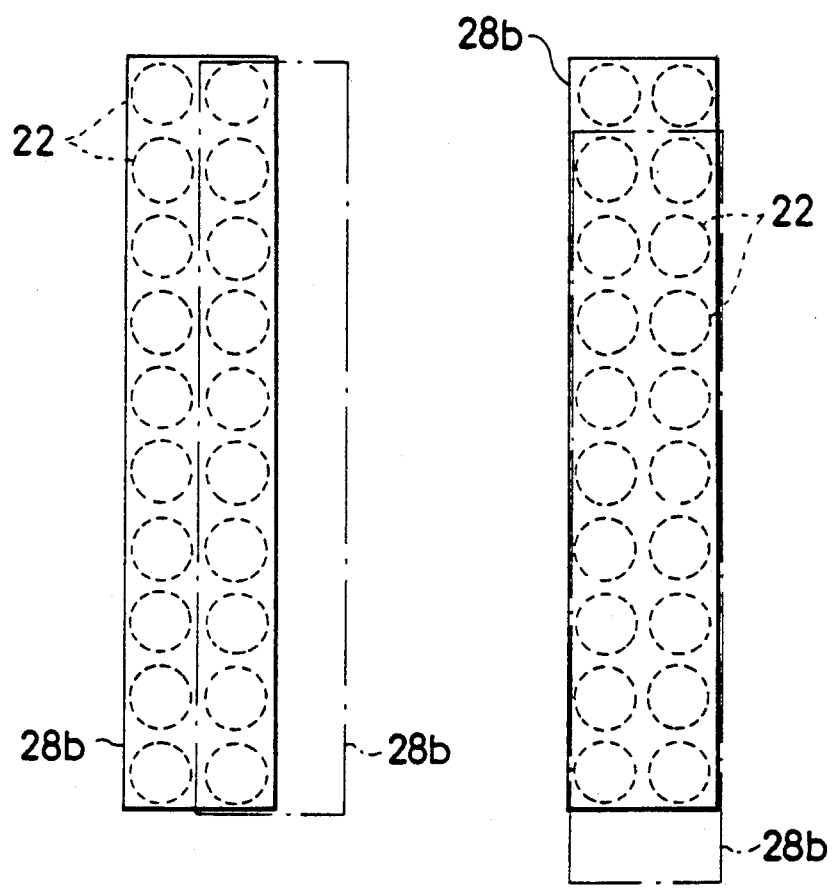
Figure 7A:
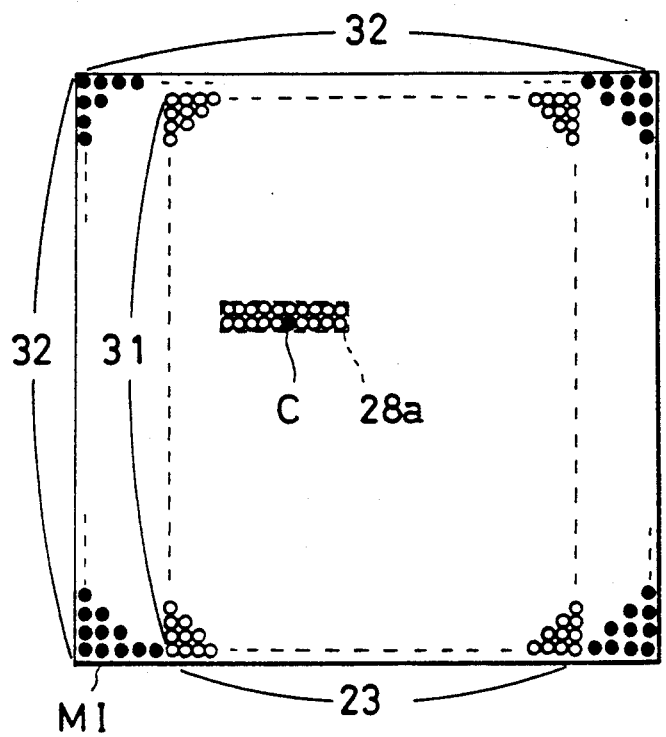
FIGS. 7A to 7C are views showing the layout of the sensor elements corresponding to the microimages, respectively.
Figure 7B:
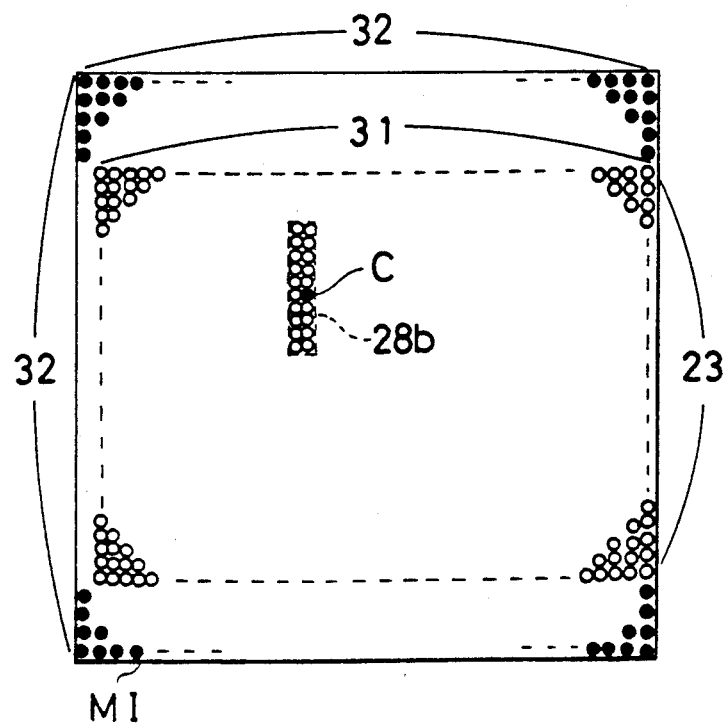

As shown in FIGS. 6A and 6B (only the vertical sensor element is illustrated), the horizontal or vertical sensor elements 28a or 28b have a light-receiving area which can contain microimages of the 2×10 radiant pixels 22, and a large number of sensor elements are offset by one pixel in the horizontal direction (FIG. 6A), the vertical direction (FIG. 6B) or both the horizontal and vertical directions. The 713 (=31×23) sensor elements 28a and the 713 (=23×31) sensor elements 28b are arranged to cover the entire surface of the corresponding single microimage consisting of 32×32 pixels, as shown in FIGS. 7A and 7B. Referring to FIGS. 7A and 7B, when a pixel located at almost the center of one sensor element 28a (28b) is given as C, it is apparent that the 713 (=31×23 or 23×31). central position pixels represented by hollow circles are present except for the peripheral portion of the microimage MI.

The 713 sensor elements 28a and 28b are distributed and located in a one-to-one correspondence in the microimage MI formed as a large number of parallel channels by the microlenses 26 so as not to cause the light-receiving areas to overlap each other, as shown in FIG. 5A. In the arrangement of FIG. 5A, the 713 horizontal sensor elements 28a or the 713 vertical sensor elements 28b are distributed in the 4×12 microimages MI.

Figure 7C:
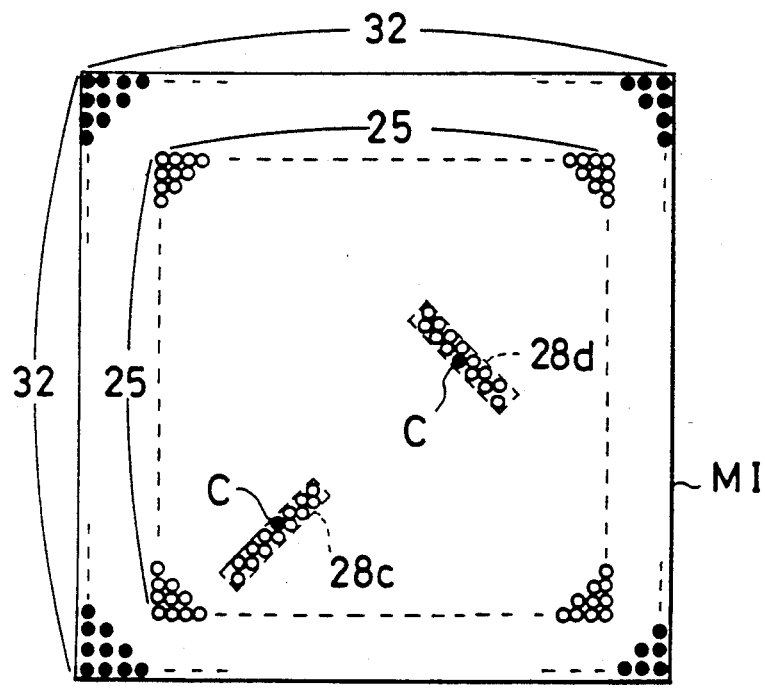

Each of the two diagonal (45° and 135°) sensor element 28c and 28d has almost the same light-receiving size as that of the horizontal or vertical sensor element 28a or 28b, as shown in FIGS. 6C and 6D (only the sensor element 28c is illustrated). The light-receiving area can has a microimage of about 2×7 radiant pixels 22. The large number of diagonal sensor elements 28c (28d) are offset by one pixel in the horizontal direction (FIG. 6C), the vertical direction (FIG. 6D) or both the horizontal and vertical directions. The 625 (=25×25) sensor elements 28c or the 625 sensor elements 28d are formed to cover the entire surface of one microimage MI consisting of 32×32 pixels, as shown in FIG. 7C. That is, as shown in FIG. 7C, when a pixel corresponding to almost the center of one sensor element 28c (28d) is defined as C, the 625 central position pixels represented by hollow circles are present except for the peripheral portion of the microimage MI.

The 625 sensor elements 28c and 28d are distributed in the microimage MI of a large number of channels so as not to cause their light-receiving areas to overlap each other, as shown in FIG. 5B. The number of microimages MI capable of arranging the 625 sensor elements 28c (28d) is 4×12 in the arrangement of FIG. 5B.

The sensor element 28e or 28f for extracting the projection features has a 1/16 size of the area of the microimage MI which is divided into 16 in the horizontal and vertical directions. One element has an area which can contain a microimage consisting of 4×16 (or 16×4) radiant pixels 22. The sensor elements 28e and 28f are distributed in the (our microimages so as to be spaced apart from each other.

Light-receiving outputs from the sensor elements 28f and 28e are combined and added by the digital data processor 40 in FIG. 1 to obtain extraction results of horizontal projection feature extraction zones HZ1 to HZ8, vertical projection feature extraction zones VZ1 to VZ8 and area projection extraction zones AZ1 to AZ4 obtained by dividing the microimage MI into 4 areas in the horizontal and vertical directions.

A total number of the sensor elements 28a to 28d is 2,676, and a total number of sensor elements 28e and 28f is 32. These 2,708 elements are arranged as shown in FIGS. 5A to 5C. However, other arrangements may be performed unless the sensor areas overlap each other.

FIG. 9 shows a read circuit for the photosensor array 27. The sensor elements 28 (28a to 28f) comprise, e.g., photodiodes respectively connected to MOS transistor switches 28g for extracting the outputs from the photodiodes. Outputs from the photodiodes are supplied to an output terminal 27a through X-direction selection MOS transistors 28h.

This read circuit is the same as a MOS image pickup device except that the sensors 28a to 28f are arranged in the rectangular shape. The MOS transistors 28g are turned on by a Y-scanning circuit 29y through Y-scanning lines 28y connected to the gates of the corresponding MOS transistors 28g in units of horizontal lines. The MOS transistor switches 28h are turned on by an X-scanning circuit 29x through X-scanning lines 28x connected to the gates of the corresponding MOS transistor switches 28h.

The output terminal 27a generates 2,708 serial sensor output signals j and their nonuniformity is compensated by the compensation circuit 30 shown in FIG. 1. The compensated signals are then written in the elemental feature buffer memory 41. The scanning signals of the X- and Y-scanning circuits 29x and 29y are synchronized with the write address signal for the buffer memory 41. A one-to-one correspondence is established between the sensor elements 28a and 28f and the addresses of the memory 41. The scanning and address signals are generated on the basis of a clock signal i from the system control circuit 60.

Figure 10:
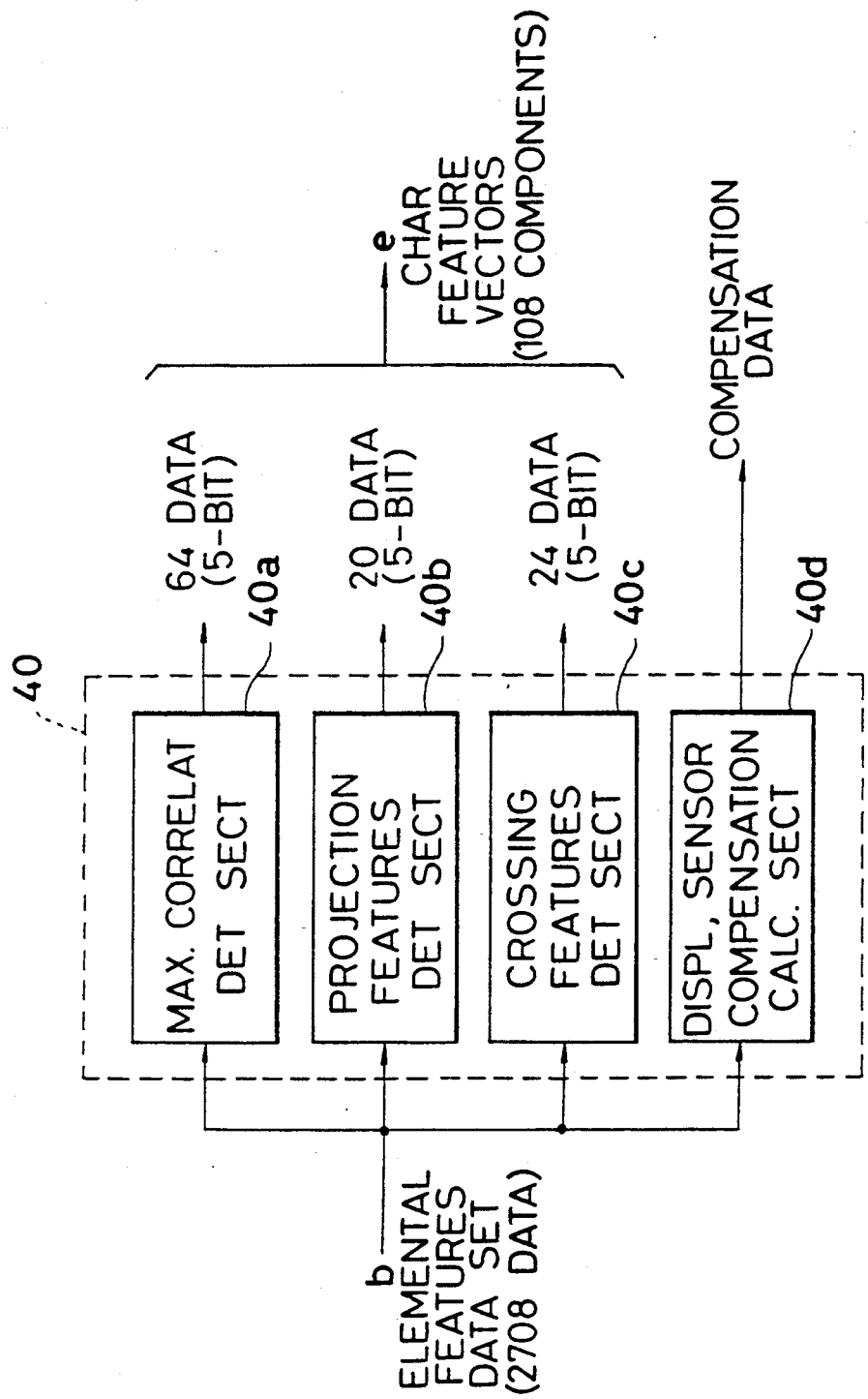
FIG. 10 is a functional block diagram of a digital data processor.

The elemental feature data set b stored in the elemental feature data buffer memory 41 is read out by the MPU 42 and is processed to generate the character feature vector e. FIG. 10 is a functional block diagram of the digital data processor 40 including the MPU 42. The functional block consists of a maximum correlation detection section 40a, a projection features detection section 40b, a crossing features detection section 40c, a display, sensor compensation calculation section 40d for calculating a display intensity, a sensor level and a sensor sensitivity.

The maximum correlation detection section 40a classifies the elemental feature data from the 2,676 sensor elements 28a to 28d into groups and detects a maximum value of each group. This classification is performed with respect to a 32×32 pixel display image area corresponding to a display operation of the display 21 or the microimage area MI. As shown in FIG. 11, for example, the elemental feature data are classified into a matrix having 16 (=4×4) segments S1 to S16. Each segment includes 64 (=8×8) pixels 22.

The elemental feature data buffer memory 41 has 16 memory areas addressed so as to correspond to the segments S1 to S16 shown in FIG. 11. Output data from the horizontal sensor elements 28a are grouped into 16 memory areas so that the center C of the element 28a shown in FIG. 7A belongs to any one of the segments S1 to S16 shown in FIG. 11. The number of data stored in each memory area is a maximum of 64 (=8×8). The number of data stored in the peripheral memory areas is smaller than 64. For example, each memory area corresponding to the segment S1, S4, S13 or S16 includes 24 data.

Similarly, the elemental feature data as output from the vertical and diagonal sensor elements 28b to 28d are classified in correspondence with the 16-segment memory areas. This classification is performed such that the center C of each of the sensor elements 28b to 28d shown in FIGS. 7B and 7C belongs to any one of the segments S1 to S16.

The addresses of the memory 41 which correspond to the segments S1 to S16 are prestored in ROM 43 in units of horizontal, vertical and diagonal directions. The memory 41 is accessed in units of segments.

When one of the stroke elements of an image displayed on the display 21 coincides in position with one of the sensor elements 28a to 28d, the coincidence can be expressed by maximum data in the segment to which this sensor element belongs. That is, positional matching between one of the stroke elements of the image and one of the sensor elements 28a to 28d can be detected by maximum value detection. A degree of matching, i.e., a correlation value between the stroke element and the sensor element is expressed by the maximum value of the elemental feature data in units of segments S1 to S16.

The maximum correlation detection section 40a receives the outputs from the horizontal, vertical and diagonal sensor elements 28a to 28d and calculates and outputs 16 horizontal correlation data H1 to H16, vertical correlation data V1 to V16, 45° correlation data P1 to P16, 135° correlation data N1 to N16 on the basis of the above principle, as shown in FIGS. 12A to 12D. One data is 5-bit (32 levels) digital data. Large correlation values such as "18", "20" and "23" represent that any one of the horizontal, vertical and diagonal character stroke elements is present in the corresponding one of the segments S1 to S16. A total of 64 correlation data are supplied from the maximum correlation detection section 40a to the vector-matrix computer 50 as a part of components of the character feature vector e.

Figure 8:
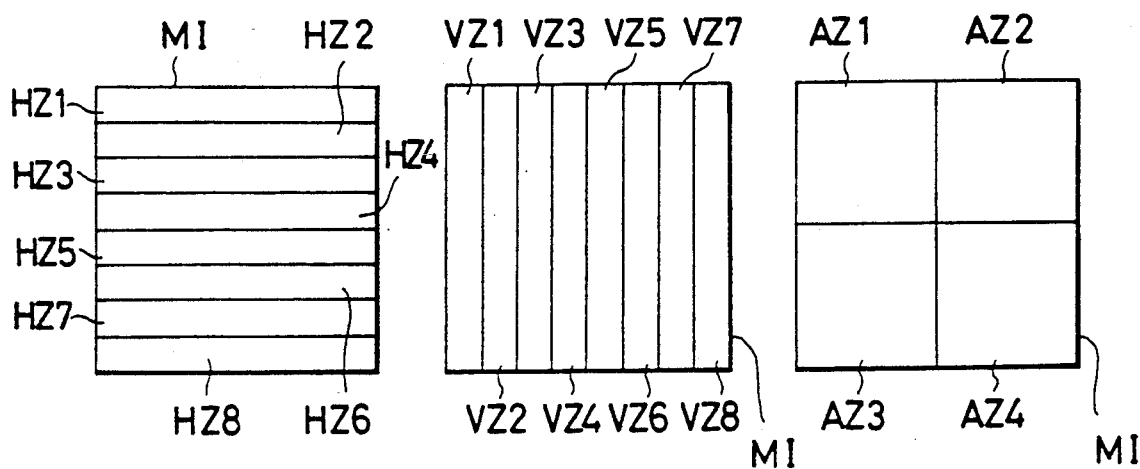
FIG. 8 is a view showing the layout of projection features detection zone formed in correspondence with the microimage.

The projection features detection section 40b in FIG. 10 calculates projection data for the horizontal projection feature extraction zones HZ1 to HZ6, the vertical projection feature extraction zones VZ1 to VZ6, and the area projection feature extraction zones AZ1 to AZ4 shown in FIG. 8. As for the zones HZ1 to HZ8, two of the outputs from the horizontal sensor elements 28e of FIG. 5C are added by the MPU 42 to obtain feature data upon projection of an image in the horizontal direction. Similarly, two of outputs from the vertical sensor elements 28f of FIG. 5C are added to obtain vertical projection feature data. Four of the outputs from the elements 28e or 28f are added to obtain area projection data for the zones AZ1 to AZ4.

A total of 20 projection feature data comprise 5-bit data and are supplied to the vector-matrix computer 50 as a part of components of the character feature vector e.

The crossing features detection section 40c detects as feature data crossing features between the stroke elements of the character image and the horizontal, vertical, 45° diagonal and 135° diagonal lines. For this purpose, as shown in FIGS. 13A to 13D, a display image area consisting of 32 and 32 pixels or the area of the microimage MI is divided into eight horizontal segments HS1 to HS8, eight vertical segments VS1 to VS8, eight 45° segments PS1 to PS8 and eight 135° segments NS1 to NS8. These segments group the horizontal, vertical and diagonal lines which crosses stroke elements of a character image.

In the same manner as the segments S1 to S16 shown in FIG. 11, the segments HS, VS, PS and NS are defined by classifying the elemental feature data as the sensor element outputs by determining a specific segment to which the center C of each of the sensor elements 28a to 28d belongs. That is, the area of the memory 41 which stores the elemental feature data is divided so as to correspond to the segments HS, VS, PS and NS. A set of addresses corresponding to the respective segments is programmed beforehand in the ROM 43. The MPU 42 can access the memory 41 in units of segments.

Figure 13A:
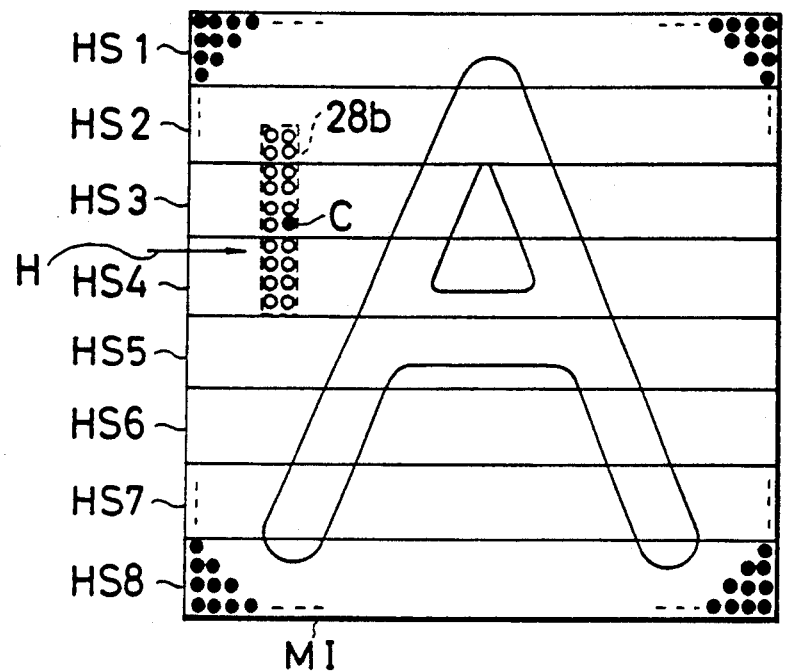
FIGS. 13A to 13D are views showing the segment layout in an image area for detecting crossing features between a pattern to be recognized and horizontal, vertical and diagonal lines.
Figure 13B:
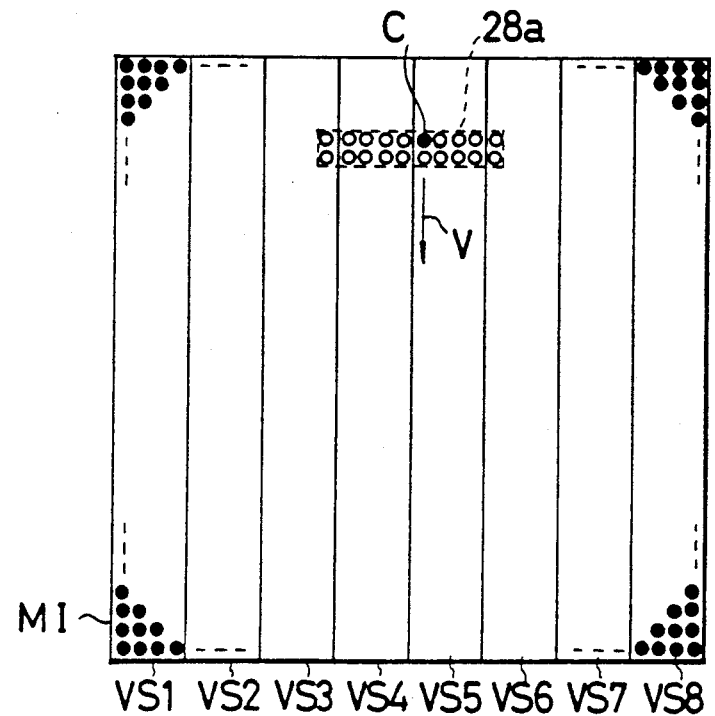
Figure 13C:
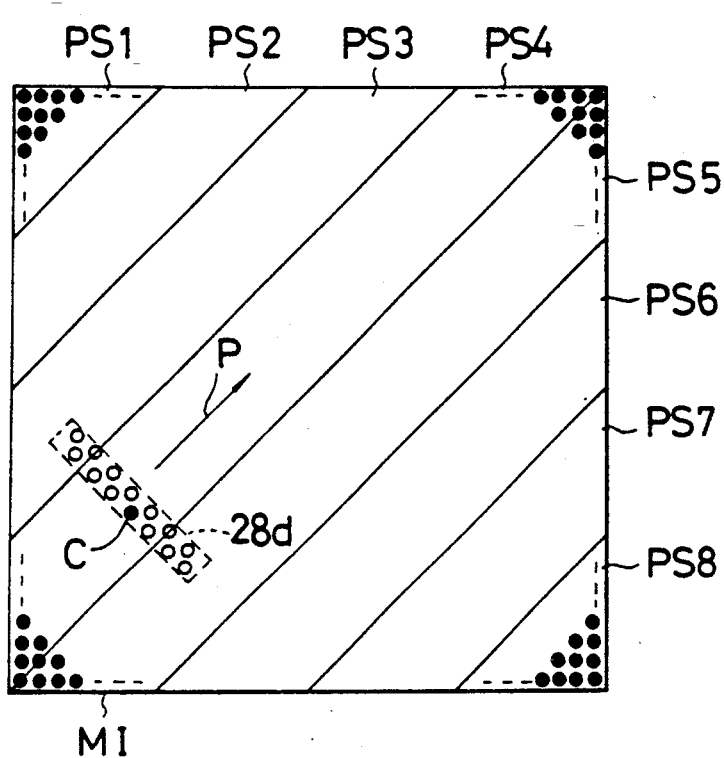
Figure 13D:
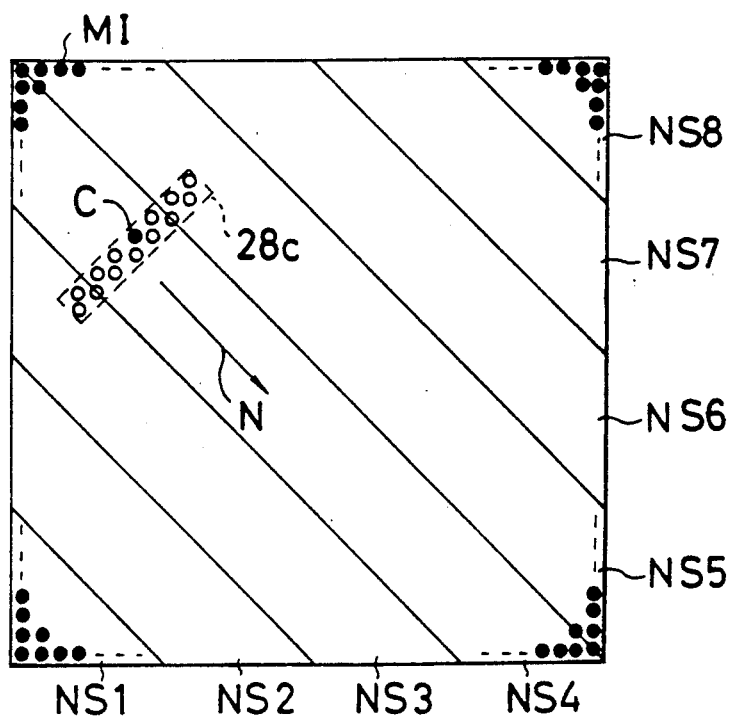

As shown in FIGS. 13A and 13B, output data of the vertical sensor elements 28b are assigned to the horizontal segments HS, and output data from the horizontal sensor elements 28b are assigned to the vertical segments VS. As shown in FIGS. 13C and 13D, output data of the 45° segments PS are assigned to the 45° segments PS, and output data of the 45° sensor elements 28c are assigned to the 135° segments NS.

The crossing features detection is based on the principle wherein differences between adjacent data of a data string aligned in the longitudinal direction of each segment are calculated, and the number of differential values exceeding a predetermined value is counted, and the number of times of crossing representing the count result serves as feature data.

FIG. 14 is an enlarged view of the horizontal segment HS6 in FIG. 13A. Four data strings are aligned in the segment HS6 in the horizontal direction. When a positive difference between the adjacent data exceeds a predetermined value, e.g., when a difference between the adjacent 5-bit data exceeds 12, data is set at "1". Otherwise, the data is set at "0", thereby obtaining a data strings shown in FIG. 14. The number of data of "1" is counted in units of strings. When a total number of the data of "1" is given as "8" within the segment HS6. This value is defined as the crossing feature data. This data indicates that the character image has eight crossing points with respect to the four horizontal lines within the segment HS6. In this connection, the number of negative difference values whose absolute value exceeds the predetermined value may be further added.

Data processing of crossing feature extraction of all segments in FIGS. 13A to 13D is performed in directions indicated by arrows H, V, P and N. As is apparent from comparison between FIGS. 13A and 7B, FIGS. 13B and 7A and FIGS. 13C and 7C, since no elemental feature data are present for the end segments HS1 and HS8, the end segments VS1 and VS8, the end segments PS1 and PS8 and the end segments NS1 and NS8, six horizontal crossing feature data, six vertical crossing feature data, six 45° diagonal crossing feature data and six 135° diagonal crossing feature data are obtained. That is, a total of 24 (5 bits each) feature data are added as components of the character feature vector e.

As described above, the character feature vector data e consisting of 108 components is output from the maximum correlations detection section 40a, the projection features detection section 40b and the crossing features detection section 40c shown in FIG. 10. This vector data is temporarily stored in the RAM 44 as previously described and then supplied to the vector-matrix computer 50. The vector-matrix computer 50 performs character identification processing by multiplying this vector data with reference matrix data.

The compensation circuit 30 shown in FIG. 2 will be described below. As described above, this circuit compensates variations in intensities of 1,024 radiant pixels of the display 21 and variations in reception sensitivity levels of the 2,708 sensor elements 28a to 28e and improves precision of the character feature vector data e.

One pixel 22 of each of the four blocks BL1 to BL4 shown in FIG. 3 is selected and energized with a reference current to correct the intensity of the display 21. These four turn-on images are multiplied by the lens array 27 to obtain reception outputs from the sensor elements 28a to 28e respectively assigned to the 16×16 microimages MI. Since these outputs are stored in the buffer memory 41 as elemental feature data, the MPU 42 adds all these elemental feature data and divides them by the number of sensor elements 28 to obtain an average value. At this time, the reception sensitivity levels of the sensor elements 28a to 28e are not yet compensated. The variations in sensitivity can be neglected by the above averaging operation.

The resultant average value is given as the noncompensated intensity of the ON pixels 22 and obtain a deviation from a reference intensity. The deviation is added to or subtracted from the reference ON current to obtain intensity compensation data. This data is supplied from the MPU 42 to the corresponding address of the intensity compensation memory 36 and stored therein. This operation is repeated 256 times, i.e., for 1,024 pixels. The intensity compensation data are then stored in the memory 36.

The compensation data d stored in the intensity compensation memory 36 are read out in synchronism with pixel clock pulses when the input image is to be displayed on the display 21, as previously described. Therefore, the radiant intensities of the LEDs constituting the pixels 22 can be compensated.

A display content of the display 21 is cleared and a predetermined period of time, e.g., 65 msec, has elapsed. In this state, the MPU 42 calculates a compensation value for nullifying the outputs from all the sensor elements 28a to 28e. This compensation data is supplied to and stored in the sensor zero-level compensation memory 34 having addresses assigned to the sensor elements 28a to 28e in a one-to-one correspondence.

The data stored in the compensation memory 34 are supplied to the adder/subtracter 32 in synchronism with the read operation of the sensor elements 28a to 28e and can cancel offset components caused by a dark current or the like of each sensor element.

All the pixels 22 of the display 21 are turned on, and the radiant intensities of all the pixels have already been calibrated to have the same value. At this time, the MPU 42 divides the output data from the sensor elements 28a to 28e by the reference output to obtain proportional coefficients. These coefficients as gain compensation data are stored at addresses of the gain compensation memory 35 in correspondence with the sensor elements.

The data stored in the compensation memory 35 are supplied to the multiplier 33 in synchronism with the read operation of the sensor elements 28a to 28e to compensate for variations in reception sensitivity levels of the sensor elements. The number of pixels of the microimage included in the reception area of the sensor elements 28a and 28b is 20 (=2×10). The number of pixels corresponding to the sensor elements 28c and 28d is 14 (=2×7). The number of pixels corresponding to the sensor elements 28e and 28f is 32 (=4×8). The differences in reception output levels caused by differences in numbers of pixels can also be compensated by gain compensation.

In the above embodiment, elements such as photodiodes having stripe-like light-receiving surfaces are formed on a semiconductor substrate, e.g., a silicon substrate, as the sensor elements 28a to 28d by selective diffusion techniques.

FIG. 15 shows another embodiment showing the shape and layout of the sensor elements different from those in the above embodiment. In the embodiment of FIG. 15, one, two or four sensor elements 70a to 70d indicated by dotted lines are arranged in each microimage MI. A light-shielding mask having one of strip-like light-transmitting areas 71a to 71d in the horizontal, vertical, 45° and 135° directions is formed on a corresponding one of the sensor elements 70a to 70d. The masks having the light-transmitting areas 71a to 71d and the sensor elements 70a to 70d constitute elements having the same functions as the stripe-like sensor elements 28a to 28d shown in FIGS. 5A and 5B. Therefore, the large number of light-transmitting areas 71a to 71d having the same sizes as those of the sensor elements 28a to 28d and the same number of positions relative to the microimages MI as those of the sensor elements 28a to 28d are formed.

The sensor element 70a is located at the central portion of the microimage MI. The sensor element 70b consists of two elements extending at the center within the microimage in the horizontal direction. The sensor element 70c consists of two elements located at the center in the microimage MI in the vertical direction. The sensor element 70d consists of four elements obtained by dividing the microimage MI into four. The light-transmitting areas 71a to 71d are respectively assigned to the sensor elements 70a to 70d.

There are nine types of horizontal light-transmitting areas 71a which are formed in the sensor elements 70a. There are 14 types of horizontal light-transmitting areas 71a which are formed in the sensor elements 70b. There are 270 types of horizontal light-transmitting areas 71a which are formed in the sensor elements 70c. There are 420 types of horizontal light-transmitting areas 71a which are formed in the sensor elements 70d. Therefore a total of 713 types of light-transmitting areas 71a are formed. The number of microimages MI used in the above arrangement is 256.

Similarly, there are 713 types of vertical light-transmitting areas 71b which are distributed in the 256 microimages MI.

There are 36 types of 45° light-transmitting areas 71c and 36 types of 135° light-transmitting areas 71d which are formed in the elements 70a. There are 114 types of 45° light-transmitting areas 71c and 114 types of 135° light-transmitting areas 71d which are formed in the elements 70b. There are 114 types of 45° light-transmitting areas 71c and 114 types of 135° light-transmitting areas 71d which are formed in the elements 70c. There are 361 types of 45° light-transmitting areas 71c and 361 types of 135° light-transmitting areas 71d which are formed in the elements 70d. Therefore, a total of 625 types of light-transmitting areas 71c and a total of 625 types of light-transmitting areas 71d are distributed in the 256 microimages MI.

In the embodiment of FIG. 15, a total number of microimages MI required to obtain the arrangement is 1,024. This can be formed by a 32×32 matrix lens array.

The sensor elements 70a to 70d are connected together with MOS transistor switches in the vertical and horizontal directions so as to arrange the same read circuit as in FIG. 9.

Figure 16:
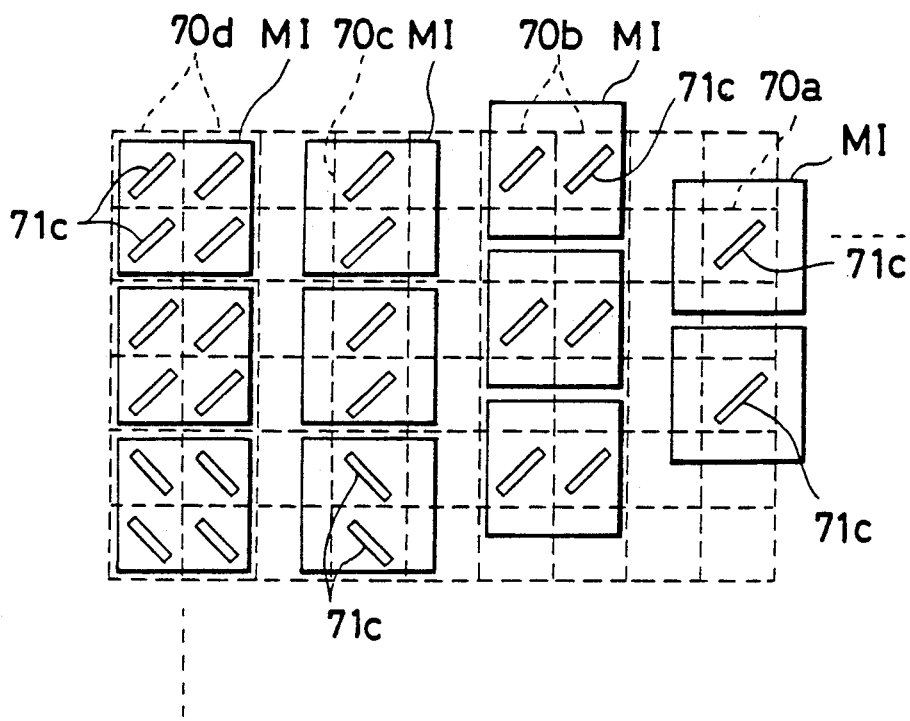

FIG. 16 shows a modification of the layout of the rectangular sensor elements 70a to 70d. One sensor element 70a, two sensor elements 70b, two sensor elements 70c or four sensor elements 70d are arranged in each microimage MI, and one of light-transmitting areas 71a to 71d is formed in each sensor element in the same manner as in FIG. 15. However, the sensor elements 70a to 70d are aligned in the horizontal and vertical directions without offset amounts, whereas the positions of the microimages MI are offset from each other. That is, the microimage MI corresponding to the sensor element 70a is offset downward by a ¼ pitch, and the microimage corresponding to the sensor element 70b is offset upward by a ¼ pitch.

In the layout of FIG. 16, a sensor array in which sensors having rectangular light-receiving areas are regularly aligned in the horizontal and vertical directions is used, and only the sensors corresponding to the layout of FIG. 16 are used. If optical conditions are satisfied, a commercially available MOS or CCD image pickup device can be used as the photosensor array 27.

In the arrangement of FIG. 16, the number of optical channels constituting the microimage MI is 1,024. The positions of the images MI can be compensated by compensating the positions of the microlenses 26. The light-receiving regions 71a to 71d of the light-shielding masks must be compensated in correspondence with the positions of the microimages MI.

According to the present invention with the above arrangement, horizontal, vertical and diagonal stroke elements constituting an input image pattern can be easily decomposed and extracted at a high resolution. Photodetection elements need not be arranged in accordance with the reference pattern, and exhibits a high resolution even for a pattern subjected to deformation (i.e., a handwritten character). The present invention is particularly suitable for an optical character reader of handwritten Chinese characters.

Since a large number of photodetection elements are distributed in a large number of parallel microimages, the resolution can be improved and manufacture can be facilitated without any geometric limitations.

What is claimed is:

1. An optical pattern extracting apparatus comprising:

display means consisting of arrays of radiant pixels for forming a radiant image of a pattern to be recognized in accordance with input image data;

a large number of strip-like photosensor means, located at focusing positions of the microimages, for decomposing the pattern to be recognized into constituent elements and detecting the constituent elements, wherein each of said strip-like photosensor means comprises groups of elements oriented in horizontal, vertical and diagonal direction, said elements in each group comprise a large number of photodetection elements offset in the horizontal and vertical directions in units of pixels to cover an entire area of pixel array, and said photodetection elements are distributed in the large number of microimages to prevent light-receiving areas of said photodetection elements from overlapping each other.

2. An apparatus according to claim 1, wherein the constituent elements of the pattern to be extracted are stroke elements of a character.

3. An apparatus according to claim 1, wherein said photodetection elements constituting said photosensor means comprise photosensor elements each having a strip-like light-receiving area.

4. An apparatus according to claim 1, wherein said photodetection elements constituting said photosensor means comprise photosensor elements and light-shielding masks having strip-like light-transmitting areas and placed on light-receiving surfaces of said photosensor elements, respectively.

5. An apparatus according to claim 1, wherein said diagonally oriented elements of said photosensor means comprise elements oriented in a 45° direction and elements oriented in a 135° direction.

6. An apparatus according to claim 1, wherein each of said strip-like photodetection elements constituting said photosensor means has a width corresponding to two pixels constituting the microimage.

7. An apparatus according to claim 1, wherein a length of each of said strip-like photodetection elements constituting said photosensor means is about five times a width thereof.

8. An apparatus according to claim 1, wherein said image multiplication optical system comprises a projection lens spaced apart from said display means by a focal length, and a lens array located behind said projection lens and consisting of a plurality of microlenses having optical axes parallel to an optical axis of said projection lens.

9. An apparatus according to claim 1, wherein said photosensor means consisting of said larger number of photodetection elements comprises a read circuit for sequentially reading outputs from said photodetection elements on the basis of a predetermined read clock in the form of a serial signal.

10. An apparatus according to claim 1, further comprising maximum correlation detecting means for detecting a maximum value of the outputs from said photodetection elements belonging to each of segment areas defined by dividing an area of a pixel array corresponding to the microimage in a matrix form, and for outputting the maximum value as correlation data representing positional matching between one of the constituent elements of the pattern to be extracted and one of said photodetection elements within respective segments areas defined for each group of horizontal, vertical and diagonal photodetection elements.

11. An apparatus according to claim 10, wherein said maximum correlation detecting means comprises an A/D converter for converting an output from said photosensor means into digital data, a memory for storing A/D-converted data, addressing means for generating addresses corresponding to the segment areas of said memory, and a data processor for processing readout data from said memory to obtain the maximum correlation value.

12. An apparatus according to claim 10, further comprising a vector-matrix computer for multiplying feature vector data having output data of said maximum correlation detecting means as a component thereof with a set of reference matrix data predetermined in correspondence with a large number of reference patterns to perfom vector classification.

13. An apparatus according to claim 1, further comprising crossing features detecting means for detecting a difference value between adjacent data in a longitudinal direction of data string constituted by the outputs of said photodetection elements which belong to one of segment areas in groups respectively defined by dividing an area of a pixel array corresponding to the microimage, into a plurality of vertical segments, a plurality of horizontal segments and a plurality of diagonal segments, on the bases of said difference values, crossing feature data representing the number of crossing points between the constituent elements of the pattern to be plurality of diagonal segments, on the bases of said difference values, crossing feature data representing the number of crossing points between the constituent elements of the pattern to be extracted and horizontal, vertical and diagonal lines being derived in units of horizontal, vertical or diagonal segments.

14. An apparatus according to claim 13, wherein data belonging to the horizontal segments are outputs from said photodetection elements oriented vertically, data belonging to said vertical segments are outputs from said photodetection elements oriented horizontally and data belonging to said diagonal segments are outputs from photodetection elements oriented in a direction perpendicular to a longitudinal direction of said diagonal segments.

15. An apparatus according to claim 13, wherein said crossing features detecting means comprises counting means for detecting the number of differences exceeding a predetermined value within respective segments.

16. An apparatus according to claim 13, wherein said crossing features detecting means comprises an A/D converter for converting an output from said photosensor means into digital data, a memory for storing A/D-converted data, addressing means for generating addresses corresponding to the horizontal, vertical and diagonal segments of said memory, and a data processor for processing data read out from said memory to obtain the crossing feature data.

17. An apparatus according to claim 1, wherein respective areas of the microimage are divided into a plurality of horizontal zones and plurality of vertical zones, photodetection elements corresponding to said pluralities of horizontal and vertical zones are located at focal positions of said parallel microimages to generate outputs as horizontal and vertical projection feature data to be extracted from the image pattern.

18. An apparatus according to claim 17, further comprising projection features detecting means for adding outputs from a plurality of components constituting each of said photodetection elements in the zones and for outputting a sum as the projection feature data corresponding to one zone.

19. An apparatus according to claim 1, wherein an area of the microimage is divided into a plurality of matrix zones, photodetection elements corresponding to the matrix zones are located at focal positions of the microimage to output projection feature data to be extracted in units of zones from the pattern.

20. An apparatus according to claim 19, wherein each of said photodetection elements respectively corresponding to the zones comprises a plurality of elements, outputs from said plurality of elements are added to output a sum as the projection feature data corresponding to one zone.

21. An apparatus according to claim 1, further comprising: and for outputting the maximum value as correlation data representing positional matching between one of the constituent elements of the pattern to be extracted and one of said photodetection elements in within respective segments areas defined for each group of horizontal, vertical or diagonal photodetection elements;

crossing features detecting means for detecting a difference value between adjacent data in a longitudinal direction of data string constituted by the outputs of said photodetection elements which belong to one of segment areas in groups respectively defined by dividing an area of a pixel array corresponding to the microimage into a plurality of vertical segments, a plurality of horizontal segments and a plurality of diagonal segments, on the basis of said difference values, crossing feature data representing the number of crossing points between the constituent elements of the pattern to be extracted and horizontal, vertical and diagonal lines being derived in units of horizontal, vertical and diagonal segments; and a vector-matrix computer for multiplying feature vector data having components consisting of output data of said maximum correlation detecting means and said crossing feature detecting means with a set of reference matrix data predetermined in correspondence with a large number of reference patterns to perform vector classification.

22. An apparatus according to claim 21, further comprising:

projection features detecting means for outputting an output from each of said photodetection elements as projection feature data for the pattern to be extracted in units of zones, the zones being constituted by a plurality of horizontal zones and a plurality of vertical zones which constitute the area of the microimage, said photodetection elements corresponding to the zones being located at focusing positions of parallel microimages, said projection feature data being added as components of the feature vector data to be supplied to said vector-matrix computer.

23. An apparatus according to claim 1, further comprising:

a memory for storing compensation data for uniforming intensities of radiant pixels of said display means; and display driving means for compensating the intensity of each radiant pixel by modulating a drive signal supplied to said display means on the basis of data read out from said memory, the drive signal being formed in correspondence with the input image data.

24. An apparatus according to claim 23, further comprising display intensity compensating means for calculating an average value of outputs from said large number of photodetection elements in the large number of parallel microimages formed in correspondence with a radiant operation of one of radiant pixels of said display means, and for storing in said memory the intensity compensation data for compensating a difference between the average value and a predetermined reference value.

25. An apparatus according to claim 1, further comprising:

a memory for storing compensation data for compensating offset components of outputs from said photodetection elements constituting said photosensor means; and adding/subtracting means for compensating output levels of said photodetection elements on the basis of data read out from said memory.

26. An apparatus according to claim 25, further comprising reception level compensating means for calculating differences between a reference level value and outputs from said large number of photodetection elements in an OFF state of all pixels of said display means and for storing in said memory the differences from the reference as level compensation data.

27. An apparatus according to claim 1, further comprising:

a memory for storing compensation data for uniforming reception sensitivity levels of said photodetection elements constituting said photosensor means; and multiplying means for compensating gains of outputs from said photodetection elements on the basis of data read out from said memory.

28. An apparatus according to claim 27, further comprising reception sensitivity compensating means for calculating ratios of outputs of said large number of photodetection elements in an ON state of all pixels of said display means to a reference level value and for storing in said memory the differences from the reference as sensitivity compensation data.

29. An apparatus according to claim 1, wherein said photosensor means comprises a sensor array consisting of photodetection elements each having a rectangular light-receiving area and light-shielding masks each having one strip-like light-transmitting area included in an area of each of said photodetection elements, strip-like light-transmitting areas being directed in a horizontal, vertical and diagonal directions.

30. An apparatus according to claim 29, wherein said rectangular photodetection elements each having a size of about ¼ the size of the microimage comprise four positional relationships, i.e., a photodetection element located at the center of the microimage, two elements arranged at the center of the microimage in the horizontal direction, two elements arranged at the center of the microimage in the vertical direction, and four elements respectively located in four portions divided in the horizontal and vertical directions.

31. An apparatus according to claim 30, wherein the large number of parallel microimages are aligned in the horizontal and vertical directions, and said rectangular photodetection elements are offset from an alignment line of the microimages in correspondence with the four positional relationships.

32. An apparatus according to claim 30, wherein said rectangular photodetection elements are aligned in the horizontal and vertical directions, and said microimages are offset from an alignment line of said photodetection elements in correspondence with the four positional relationships.

* * * * *